: US006313418B1

(12) United States Patent
Reneau

(10) Patent No.: US 6,313,418 B1
(45) Date of Patent: Nov. 6, 2001

(54) GLASS ENCAPSULATED EXTENDED DWELL SHOCK SENSOR

(75) Inventor: Daniel R. Reneau, Madison, WI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 08/587,292

(22) Filed: Jan. 12, 1996

(51) Int. Cl.$^7$ .................................................. H01H 35/02
(52) U.S. Cl. .................................. 200/61.49; 200/61.51; 73/514.38
(58) Field of Search ........................ 73/514.01, 514.16, 73/514.38; 200/61.45 R, 61.48, 61.49, 61.51

(56) References Cited

U.S. PATENT DOCUMENTS

| | | | |
|---|---|---|---|
| 3,731,022 | 5/1973 | Loftus | 200/61.49 |
| 3,778,572 | 12/1973 | Matsui et al. | 200/61.45 M |
| 3,793,498 | 2/1974 | Matsui et al. | 200/61.45 R |
| 4,164,720 | 8/1979 | Bollen | 335/47 |
| 4,199,739 | 4/1980 | Deith | 335/58 |
| 4,225,836 | 9/1980 | DeMaesschalck et al. | 335/153 |
| 4,311,891 | 1/1982 | Faust | 200/61.45 R |
| 4,329,670 | 5/1982 | Bollen et al. | 335/56 |
| 4,700,974 | 10/1987 | Andres et al. | 280/806 |
| 4,857,680 | 8/1989 | Janotik | 200/61.45 R |
| 4,900,925 | 2/1990 | Andres et al. | 250/231 R |
| 4,987,276 | 1/1991 | Bader et al. | 200/61.45 |
| 5,092,172 | 3/1992 | Overman et al. | 73/517 |
| 5,155,307 | 10/1992 | Breed et al. | 200/61.45 |
| 5,192,838 | 3/1993 | Breed et al. | 200/61.45 |
| 5,231,253 | 7/1993 | Breed et al. | 200/61.45 |
| 5,233,141 | 8/1993 | Breed | 200/61.45 |
| 5,260,956 | 11/1993 | Inaba et al. | 372/38 |
| 5,360,956 | 11/1994 | Shitanoki | 200/61.45 |
| 5,389,751 * | 2/1995 | Breed | 200/61.45 R |
| 5,424,501 * | 6/1995 | Purves et al. | 200/61.48 |
| 5,440,084 | 8/1995 | Fuse et al. | 200/61.45 |
| 5,457,293 * | 10/1995 | Breed | 200/61.49 |

FOREIGN PATENT DOCUMENTS

| | | | |
|---|---|---|---|
| 35 09 054 | 4/1986 | (DE) | H01H/35/14 |
| 3830782 C1 | 7/1990 | (DE) | H01H/36/00 |

OTHER PUBLICATIONS

"Contact bounce in dry reed relays," R.O. Jenkins, PROC. IEE. vol. 114, No. 11, Nov. 1967.
"Reed Switch Application Manual," ©1987, Hamlin, Inc., Lake Mills, Wisconsin, 42 pages.

* cited by examiner

Primary Examiner—Jeffrey Sterrett
(74) Attorney, Agent, or Firm—Lonnie Drayer; Patrick Steinnon

(57) ABSTRACT

A shock sensor has a sensing mass mounted on a metallic reed or spring which, under the influence of a crash-induced acceleration, drives the spring against a contact to close an electrical circuit. The contact end of the spring is twisted to be oriented with respect to the fixed contact at an angle of 60 degrees out of the plane containing the spring. The sensor is oriented such that the acceleration force is approximately normal to the plane containing the spring. The angled contact increases reliability, reduces closure signal noise, and increases contact dwell time. Dwell time can be further enhanced for high shock loads by providing a two stage mass spring system. A second mass/spring combination is arranged so the motion of the second mass, after the first reed has made electrical contact, holds the contact closed.

10 Claims, 3 Drawing Sheets

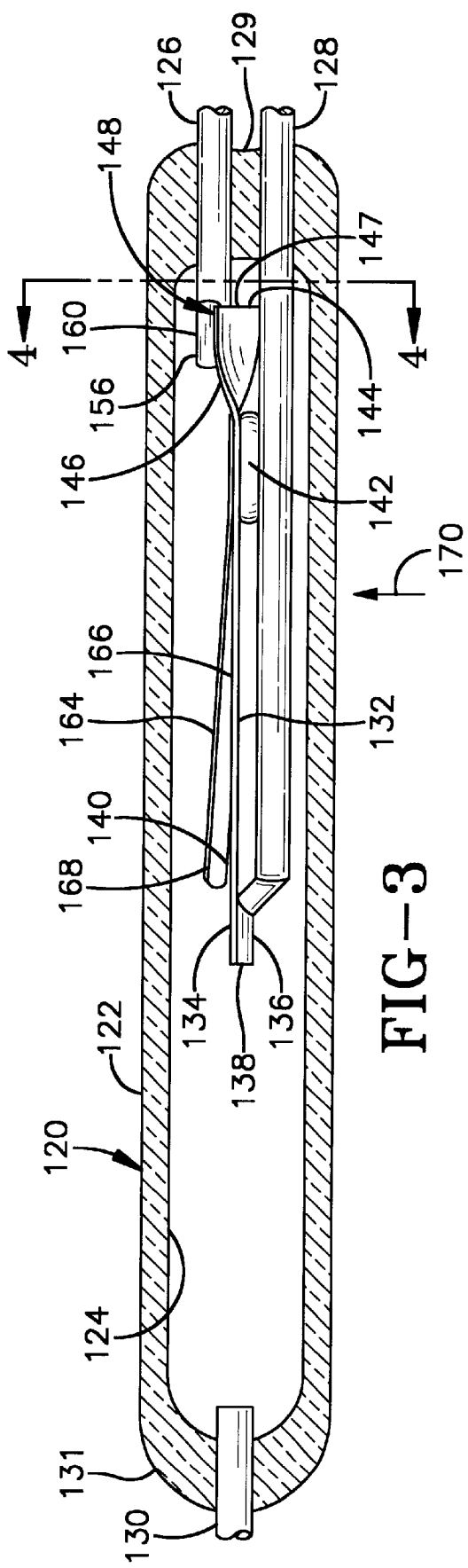
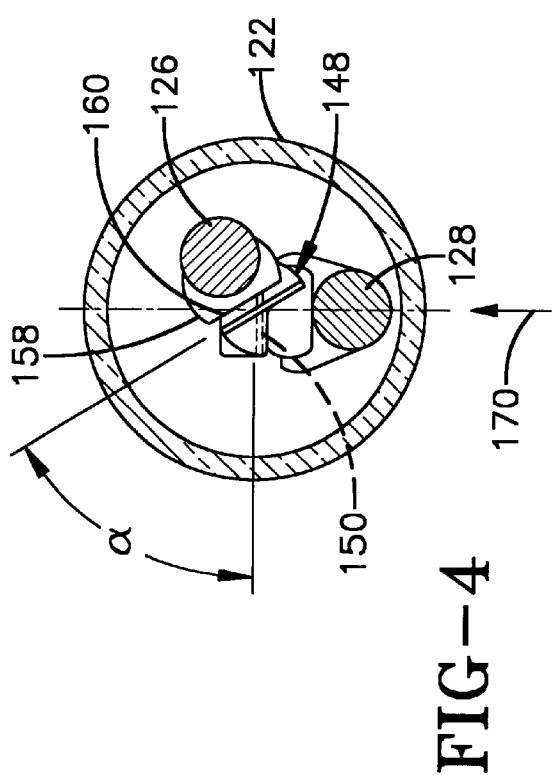
FIG-3
FIG-4

GLASS ENCAPSULATED EXTENDED DWELL SHOCK SENSOR

FIELD OF THE INVENTION

The present invention relates to shock sensors in general and to shock sensors used for engaging or deploying automobile safety devices in particular.

BACKGROUND OF THE INVENTION

Shock sensors are used in motor vehicles, including cars and aircraft, to detect vehicle collisions. When such a collision occurs, the shock sensor triggers an electronic circuit for the actuation of one or more safety devices. One type of safety device, the deployable air bag, has found widespread acceptance by consumers as improving the general safety of automobile operation. Air bags have gone from an expensive option to standard equipment in many automobiles. Further, the number of air bags has increased from a single driver's side air bag to passenger air bags with future use of multiple air bags a distinct possibility.

With the ever increasing utilization of air bags, research and development has continued with efforts to make air bags and the electronics and sensors which control their deployment both more reliable and of lower cost. A key aspect of reliability with respect to air bags involves the twin, somewhat conflicting requirements that the air bag deploy in every situation where their deployment would be advantageous to the passengers but, at the same time, not deploy except when actually needed. Reliable deployment of an air bag without unwanted deployments is facilitated by use of multiple sensors in combination with actuation logic which can assess the nature and direction of the crash as it is occurring and, based on preprogrammed logic, make the decision whether or not to deploy the air bag. This increase in reliability tends to lead to a greater number of sensors as well as increased use of electronic logic.

The desire to hold down sensor cost and to keep the sensor integrated with the logic circuits has led to the use of solid state shock sensors. However, solid state shock sensors are prone to losing touch with the real world and may occasionally indicate a crash is occurring due to radio frequency interference, electronic noise, cross-talk within the electronics, etc.

The suitability of mechanical shock sensors as an integral part of bag deployment systems which prevent unnecessary bag deployment has kept up the demand for mechanical shock sensors.

A number of types of shock sensors employing reed switches have been particularly advantageous in combining a mechanical shock sensor with an extremely reliable electronic switch which, through design, can be made to have the necessary dwell times required for reliable operation of vehicle safety equipment. The reed switch designs have also been of a compact nature such that the switches may be readily mounted on particular portions of the vehicle which, in a crash, will experience a representative shock which is indicative of the magnitude and even the direction of the shock inducing crash.

One type of shock sensor, shown in German Patent No. DE 35 09 054, employs a sensing mass mounted on a spring with a second less-rigid spring spaced from the first spring in a glass housing. An acceleration sensing mass of less than three grams is mounted to the less rigid spring.

A need remains, however, for shock sensors having lower cost, high repeatability, and small packaging, which at the same time have the advantages of a mechanical sensor in providing relatively long switch closure or dwell time in combination with insensitivity to electronic noise or interference.

SUMMARY OF THE INVENTION

The shock sensor of this invention has some structural similarities to a reed switch. But, whereas a reed switch, when functioning as part of a shock sensor, requires a moving magnetic mass, the shock sensor of this invention employs a sensing mass mounted on a metallic reed or spring which, under the influence of a crash-induced acceleration, drives the reed against a fixed contact to close an electrical circuit. In order to extend the closure duration to increase the reliability and ease with which a significant event may be detected, a contact surface at the end of the reed and the fixed contact are oriented at an angle 60 degrees out of the plane containing the reed. The 60 degree contact surface on the reed may be formed by twisting a portion of the reed adjacent to the contact end. The sensor is oriented such that the acceleration force is approximately normal to the plane containing the reed. The orientation of the contact area on the reed and the fixed contact allows contact shock to dissipate sufficiently to eliminate most bouncing upon initial closure. The 60 degree contact angle provides a more reliable, less noisy closure signal in the presence of a crash-induced shock. Dwell time of initial contact closure because of the angled contacts is increased five to ten times on even marginal sensor closing events. The dwell time on higher force events is in some instances comparable to magnetically actuated crash-sensing devices. Further, manufacturing imperfections, in achieving alignment of contact interfaces, can actually provide a softer more gradual transition to mating contact The wiping and twisting of the contact surfaces, as they come into full face-to-face contact, increases dwell time.

Closure dwell time can be further enhanced for high shock loads by providing a two stage mass spring system. A second mass is mounted to the first reed or spring by a second reed or spring. The second mass/spring combination is arranged so the motion of the second mass, after the first reed has made electrical contact, is such as to hold the contact closed.

It is a feature of the present invention to provide a shock sensor for use in triggering safety devices within a moving vehicle.

It is another feature of the present invention to utilize the technology for manufacturing reed switches in the construction of a shock sensor.

It is a further feature of the present invention to provide a shock sensor in which all electromechanical components are contained within a hermetically sealed volume.

It is yet another feature of the present invention to provide a mechanical shock sensor having fewer components.

It is a yet further feature of the present invention to provide a reed switch with reduces contact bounce on switch closure.

Further objects, features and advantages of the invention will be apparent from the following detailed description when taken in conjunction with the accompanying drawings.

BRIEF DESCRIPTION OF THE DRAWINGS

FIG. 3 is a side elevational view, broken away in section, of an alternative embodiment of the shock sensor of this invention employing a two stage mechanical system.

FIG. 4 is a cross-sectional view of the shock sensor of FIG. 3 taken along section line 4—4.

DESCRIPTION OF THE PREFERRED EMBODIMENT

Figure 1:
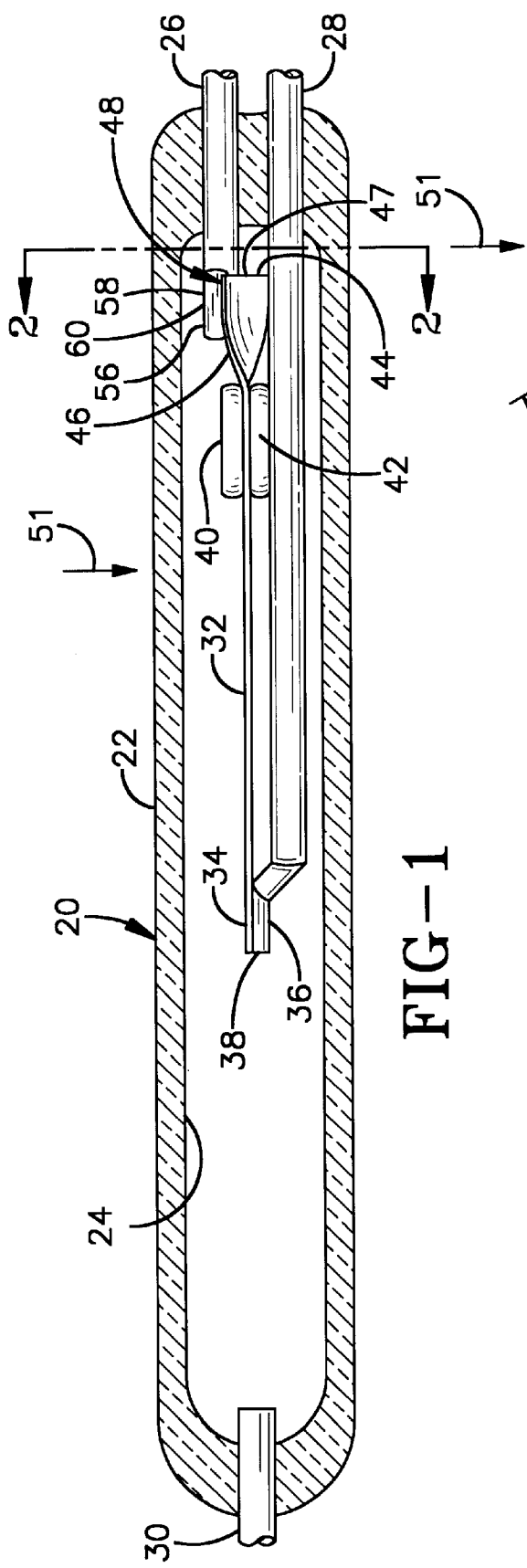
FIG. 1 is a side elevational view, broken away in section, of the shock sensor of this invention.

Referring more particularly to FIGS. 1–5, wherein like numbers refer to similar parts, a shock sensor 20 is shown in FIG. 1. The shock sensor 20 is composed of a glass capsule 22 which defines an internal volume 24. The internal volume may be filled with an inert gas or gas with a high dielectric breakdown strength. The glass capsule 22 is formed around a short lead 26, a long lead 28 and a mounting lead 30. Electrical contact is made between the short and long leads by a reed or spring 32.

Figure 2:
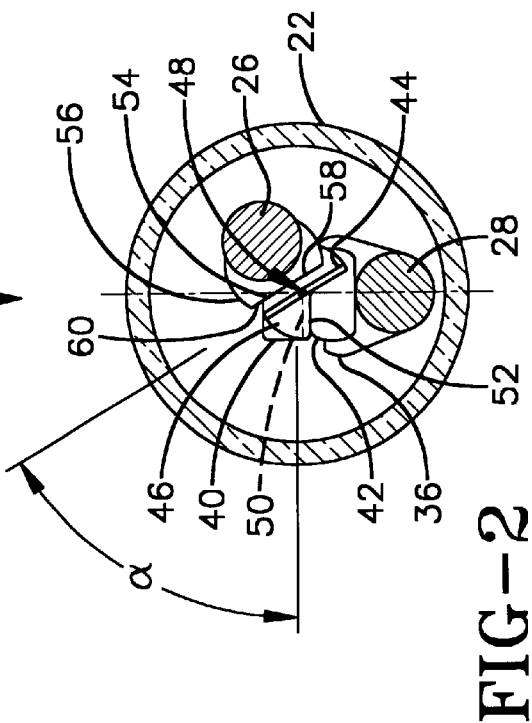
FIG. 2 is a cross-sectional view of the reed switch of FIG. 1 taken along section line 2—2.

The spring 32 has an attachment end 34 which is welded to a raised flange 36 at the free end 38 of generally rigid long lead 28. The spring 32 has a shock-sensing upper masse 40 and a shock-sensing lower mass 42 which are welded to the spring 32 adjacent the contact end 44. The contact end 44 is comprised of a twisted portion 46 and a contact flat 48. As shown in FIG. 2, the spring 32 defines a plane and the centerline of the spring defines a line 52. The twisted portion 46 is twisted about the line 52 of the spring 32 to bring the contact flat 48 into a plane 54 which is rotated through an angle α of 60 degrees with respect to the plane 50 of the spring 32. The short lead 26 has a deformed portion 56 which defines a non-moving contact 58 which has a contact surface 60.

The spring 32, in a typical shock sensor 20, may have a thickness of about 1.5 thousandths of an inch and a width of 30 thousandths of an inch. The overall length of the spring from end to end is about 480 thousandths of an inch. The dimensions of the spring thus render it substantially flexible only in a direction normal to the plane 50 in which the spring 32 lies. The normal direction defines a line 62. The line 62 normal to the plane 50 of the spring 38 is aligned with the direction of acceleration which it is desired to sense. In use, the sensor 20 may be mounted by the leads 30, 26, 28 directly to a circuit board containing some or all of the electrical components used to actuate an air bag or similar device. The sensor may also be mounted in a package (not shown) to facilitate orienting and mounting the sensor on a part of a vehicle where, through tests and analysis, it has been determined the response of the structure provides reliable indication of the direction and severity of a car crash.

The shock sensor 20 takes advantage of the manufacturing tools and techniques for making reed switches to fabricate a shock sensor. The reed switch manufacturing process has developed around the mass production of components such as leads, springs and contacts with high precision and low cost. The reed switch manufacturing process also facilitates the assembly of the leads and springs—automatically positioning them with high tolerance and sealing a hermetic glass capsule about the switch components. The extremely high reliability, long life and low cost of reed switches has found them wide employment in industry and consumer products.

The shock sensor 20, by utilizing the techniques of a reed switch manufacturer, transfers the advantages of low cost and high reliability to shock sensors suitable for use in automobile safety systems.

In operation, the shock sensor 20 is mounted in a vehicle with the line 62, which is normal to the plane of the spring 50, oriented along the expected line of action of a shock-inducing event or crash. The shock sensor 20 is further oriented so the upper mass 40 faces the direction shown by arrow 51, in which the crash load is expected. When the vehicle containing the shock sensor 20 experiences a shock-inducing crash, the vehicle rapidly decelerates, which, in turn, decelerates the glass capsule 22 of the shock sensor 20. The sensing masses 40, 42, because they are relatively unconstrained by the spring 32, continue in accordance with Newton's First Law to move forward and thereby bring the contact end 44 of the spring and the contact flat 48, formed thereon, into contact with the fixed contact 58 which is rigidly mounted to the short lead 26. The short lead is held in position by the glass capsule 22.

Because the contact flat 48 on the spring 32 and the fixed contact surface 60 on the short lead 26 engage at an angle α which is oriented sixty degrees from the the plane 50 of the spring 32 or correspondingly 30 degrees from the direction of motion of the spring and the sensing masses 40, 42, the closure between the contacts 48, 58 is softer. The soft closure results from the contact 48 on the spring sliding along the fixed contact surface 60 which, in turn, causes a limited deflection of the spring 32 in the plane of the spring 50. The sliding action between the spring contact 48 and the fixed contact 58 results in a frictional engagement between the spring contact 48 the fixed contact 50. The frictional engagement dissipates energy, helping to reduce bounce.

The spring 32 is much stiffer, in that is has greater resistance to bending, in the plane of the spring 50, than out of the plane of the spring 50. Because closure of the switch 47 results in in-plane deflection of the spring 32, when the contact 48 on the spring 32 begins to lift off the fixed contact 58, due to elastic bounce, friction between the contacts 48, 58 is reduced or eliminated. The reduction of the frictional forces between the contacts 48, 58 allows the high momentum forces developed by the in-plane deflection of the spring 32 to move the spring contact 48 back into engagement with the fixed contact 58. Thus, the tendency of the contacts of a switch to bounce open when subjected to a closing force is significantly decreased or eliminated by having the closing surfaces angled with respect to the direction of closing of the switch. In practice, the exact analysis of the dynamics of the closure of the switch are complicated by cross-coupling between the spring constant of the spring 32 in and out of the plane of the spring, as well as by manufacturing tolerances which introduce imperfections in the alignment of the angled contact surfaces. Experience with the construction of the shock sensors 20 has shown that manufacturing imperfections actually enhance switch closure time by providing a softer, more gradual transition in the mating of contact surfaces from a weak point contact, as the contact surfaces wipe and twist towards a more rigid line or face contact.

A shock sensor 120, shown in FIGS. 3 and 4, has improved dwell time through the employment of a two-stage mechanical system. The shock sensor 120 has a glass capsule 122 or housing which encloses an internal volume 124. The internal volume 124 may be filled with an inert gas or gas with a high dielectric breakdown strength. As in the shock sensor 20, the shock sensor 120 has a short lead 126 and a long lead 128 positioned at a first end 129 of the capsule 122 as well as a mounting lead 130 positioned at the opposite end 131.

The long lead 128 has a raised flat 136 at its free end 138. A first spring 132 is welded at an attachment end 134 to the raised flat 136. The spring has a contact end 144 which has a contact flat or surface 148 which is movable against a fixed contact 158 which has a contact surface 160. The fixed contact 158 is formed of a deformed portion 156 of the short lead 126. The switch 120 has a first acceleration sensing mass 142 mounted to the spring 132 near the contact end 144. Between the first mass 142 and the contact end portion of the spring 132 there is a twisted portion 146 so the contact flat or surface 148 is rotated sixty degrees out of the plane 150 in which the spring lies. As thus described, the shock sensor 120 is similar to the shock sensor 20. However, a second mechanical stage is formed by joining a second spring 164 to the first spring 132.

The second spring 164 is joined to the upper surface 166 of the spring 132 overlying the first mass 142. The second spring 164 has a free end 168 on which is mounted a second mass 140. During a crash the acceleration sensing masses 142, 140 experience an apparent acceleration in the direction of arrows 170, 172, causing them to move in the direction of the arrows 170, 172, which, in turn, causes the contact surfaces 148 and 160 to touch and close the switch 147.

Because the first acceleration sensing mass 142 is closely spaced from the contact surfaces 148,160 the engagement of the contacts brings the first mass 142 to rest with respect to the contacts. On the other hand, the second mass 140 continues to deflect even after the contacts have become fully engaged. This continual deflection continues to move the second spring 164 and thereby holds the first spring 132 against the contact 158 increasing dwell time.

Figure 5:
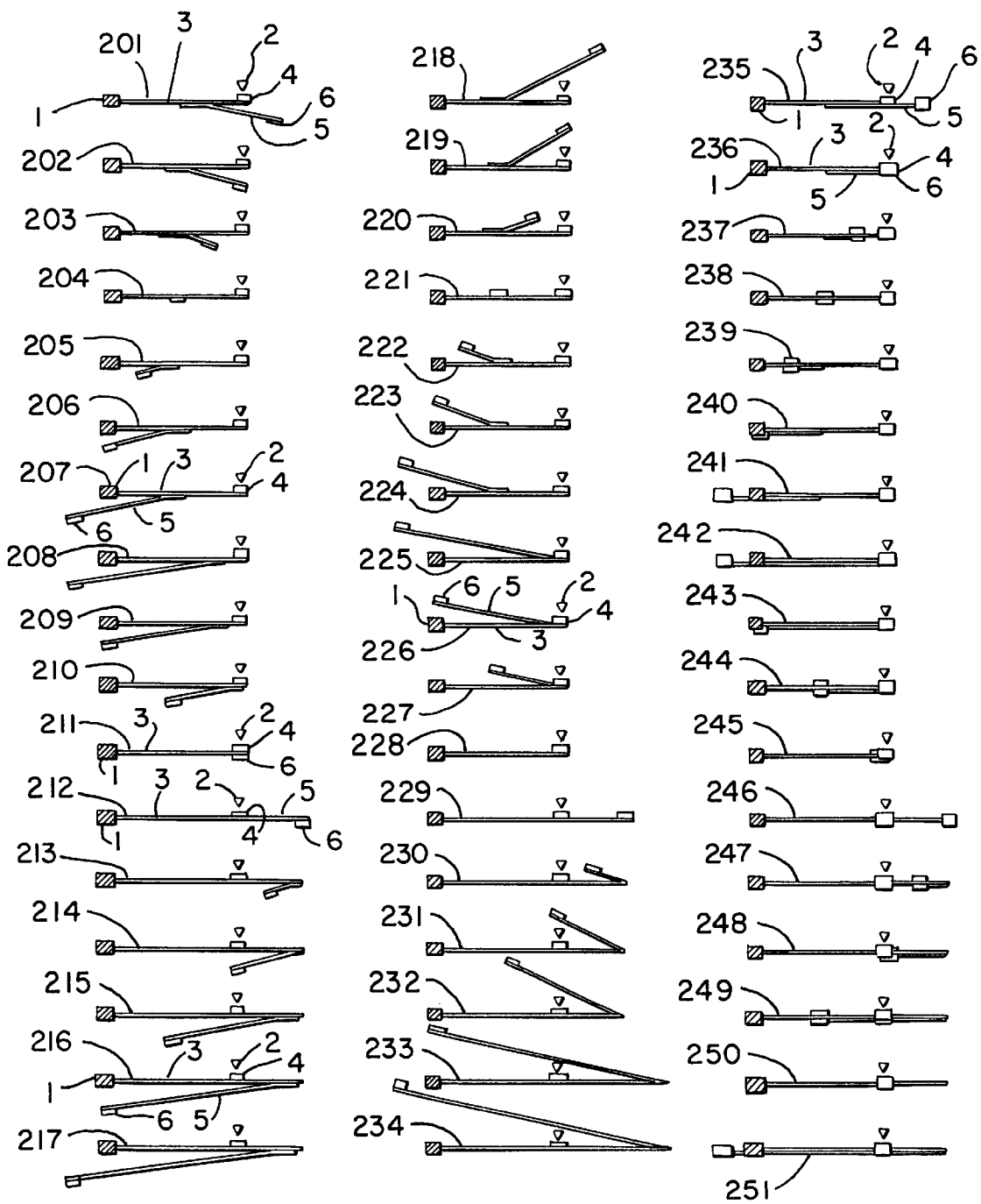
FIG. 5 is a diagrammatic view of fifty-one different spring mass systems which can be employed to increase the dwell time of the shock sensor of FIG. 1.

FIG. 5 shows fifty-one mechanical systems all except systems 211, 228 of which can be used to extend or improve the dwell or closure time of a switch. Each of the mechanical systems 201–251, illustrated in FIG. 4, has some or all of the following: a fixed mount 1, a stationary contact 2, a first spring 3, a first acceleration sensing mass 4, a second spring 5, and a second acceleration sensing mass 6.

Dynamic system 226 is closely representative of the dynamic system employed by the shock sensor 120.

The dynamic system 211, and to some extent, 204, 221, 238, is representative of the dynamic system employed by the shock sensor 20.

Dynamic systems 201–203, 205–210 and 212–217 are characterized in that the second spring 5 and second masses 6 are mounted to the first spring 3, opposite the fixed contact 2. Systems 218–220, 222–227, and 230–234 have the secondary spring 5 and secondary mass 6 attached to the side of the first spring 3 which faces the fixed contact 2.

Systems 235–251 are systems which employ secondary masses 6 on secondary springs which are parallel to and offset from the first spring 3 and first masses 4. Thus, for example, a shock sensor employing dynamic system 236 might employ a spring in the shape of a three tined fork with the first mass 4 located on the central tine and secondary masses 6 located on the outer tines. Thus, dynamic systems 235–251 may have one or two secondary masses 6 positioned on one or both sides of the primary spring 3.

Within the fifty-one mass systems disclosed in FIG. 5 some systems have greater potential for increasing switch closure dwell times and providing reliable long-term operation. Systems 204, 221 and 238 generally have a basic mass distribution. Systems 201–203, 205–207, 218–220, 222–224, 235–237, and 239–241 can produce stress concentrations at mid-spring and, for this reason, may be undesirable. On the other hand, in systems 208–210, 225–227 and 242–244, the second mass 6 and second spring 5 function to reinforce the natural function of the primary spring 3 and primary mass 4.

Systems 212, 229 and 246 represent good mass distributions where a single structural member forms both the first spring 3 and the second spring 5. In systems 213–217 and 230–234 and 247–251 the mass system increases the natural frequency of the dynamic systems and the stress concentrations induced by the flexure of the primary spring 3 about the contact point 2 occurs in homogenous material influencing concern with respect to system integrity.

It should be understood that in mass systems 201–251, systems 211, 228 and 245, do not provide a two-stage mechanical system.

Mass systems 212, 229 and 246 have some similarity to the mechanical system disclosed in German patent DE 3509054, particularly FIGS. 2 and 4 of that patent. They differ, however in that the mass distribution of systems 212, 229 and 246 are distributed such that some of the mass is directly opposite the contact point 2 and some of it is spaced beyond the contact. Also, the contact 2 is stationary as opposed to being mounted on a flexible support. Thus, it will be understood that the mass systems 201–251, with the exception of mass systems 211, 228 and 245, form means for increasing the switch dwell time by forming a two-stage mechanical system so the switch has a greater dwell time.

It will also be understood that the mass systems of FIG. 5 are illustrative of the mechanical principals and that actual shock sensors constructed in accordance with those mass systems will have minor variations necessary to accommodate actual systems. For example, in mass system 226, which is representative of shock sensor 120 of FIG. 4, the primary mass 4, which corresponds to first mass 142 in FIG. 4, is not located directly beneath the fixed contact 158 because of the practical necessity of orienting the contact surfaces 148, 160 at the sixty degree angle to the plane containing the spring 132. Thus, it will be understood that the dynamic systems 201–251, when employed in an actual shock sensor, may require some modifications to incorporate actual design constraints and additional features such as the angled contact surface between the moving contact and the stationary contact.

It should be understood that a permanent magnet or electromagnetic induced field may be used in conjunction with springs 32, 132 when they are constructed of a ferromagnetic material to induce the shock sensor 20, 120 to latch when activated. It should also be understood that an electromagnetic field could be used to induce closure of the shock sensors 20, 120 in order to provide a self-testing function.

It will also be understood that wherein a sixty degree angle is disclosed between the plane containing the spring 32, 132 and the contact surfaces 40, 48, 60, 160, displacement of the contact surfaces by angles greater than or less than sixty degrees could be used.

It should be understood that a reed switch having contacts angled with respect to the plane of the ferromagnetic reed could be constructed similar to the shock sensor 20 of FIG. 1 and 2 but without the mass 40, 42 mounted on the reed 32. A source of electromagnetic force such as a magnet or electrical coil located near the reed switch could thus cause the switch to close; the magnet by moving closer to the activation region of the switch, the coil by being energized by an electrical current. Such a reed switch should have reduced contact bounce.

It should be understood that features to prevent overtravel of spring/mass elements or contact faces may be presented by dimensional restrictions present in shock sensor 20 or 120. Other packaging approaches may make specific travel limit features necessary.

It should be understood that where the masses 40, 42 are shown as two separate pieces they could be a single mass wrapped around the spring 32 or all the mass could be mounted on one side of the spring.

It should be understood that in FIG. 1 the spring end 34 could be mounted to the free end 38 of the long leed 28 with out the formation of a raised portion 36 on the leed 28.

It is understood that the invention is not limited to the particular construction and arrangement of parts herein illustrated and described, but embraces such modified forms thereof as come within the scope of the following claims.

I claim:

1. A switch assembly responsive to an acceleration comprising:
   a) a housing;
   b) a first conductive lead extending into the housing;
   c) a second conductive lead extending into the housing;
   d) a first spring which defines a first plane, wherein the first spring is mounted to the first lead and has a fixed end and a movable end, the movable end having portions defining a first contact for completing an electrical circuit;
   e) a second contact electrically connected to the second lead and rigidly mounted to the housing thereby, wherein the first contact and the second contact are in spaced relation so that movement of the first contact surface normal to the first plane brings the first and second contacts into electrical engagement;
   f) a first acceleration sensing mass mounted directly to the first spring between the fixed end and the first contact, such that when the shock sensor is subjected to an accelerative force the first spring is bent in a direction aligned with said accelerative force to bring the first contact into engagement with the second contact to close an electrical circuit;
   g) a second spring having an end fixed to the first spring and a free end; and
   h) a second acceleration sensing mass fixed to the free end of the second spring, thereby forming a two stage mechanical system so the switch has a greater closure dwell time.

2. The shock sensor of claim 1 wherein the first contact and the second contact are inclined from the first plane.

3. The shock sensor of claim 2 wherein the inclination of the first contact and the second contact with respect to the first plane is about 60 degrees.

4. The shock sensor of claim 2 wherein the first contact and the second contact are inclined from the first plane about a line defined along the spring from the spring fixed end to the spring movable end.

5. The shock sensor of claim 4 wherein the inclination of the first contact and the second contact with respect to the first plane is about 60 degrees.

6. A shock sensor comprising:
   a) a housing;
   b) a first conductive lead extending into the housing;
   c) a second conductive lead extending into the housing;
   d) a spring defining a plane, wherein the spring has a fixed end mounted to the first lead, and a movable end, the movable end having portions defining a first contact for completing an electrical circuit, the first contact defining a first contact plane;
   e) a second contact electrically connected to the second lead, wherein the second contact has portions defining a second contact plane, and wherein the first and second contacts are in spaced parallel relation so that movement of the first contact normal to the plane defined by the spring brings the first and second contacts into electrical engagement, and wherein the first contact plane and the second contact plane are inclined with respect to the plane defined by the spring;
   f) an acceleration sensing mass mounted to the spring, wherein acceleration of the housing causes the spring to bend in a direction aligned with the accelerative force, to cause the first contact to engage the second contact and thereby make electrical connection, wherein the inclination of the first contact plane and the second contact plane from the plane defined by the spring serves to reduce closure bounce and increase closure duration;
   g) a second spring mounted to the first spring; and
   h) a second acceleration sensing mass mounted to a second spring, to thereby increase the dwell time of contact closure.

7. A shock sensor comprising:
   a) a housing;
   b) a first conductive lead extending into the housing;
   c) a second conductive lead extending into the housing;
   d) a first spring defining a plane, the first spring mounted to the first lead and having a fixed end and a movable end, the movable end having portions defining a first contact for completing an electrical circuit;
   e) a second contact electrically connected to the second lead and rigidly mounted to the housing thereby, wherein the first contact and the second contact are in spaced relation so that movement of the first contact normal to the plane defined by the spring brings the first contact into electrical engagement with the second contact;
   f) a first acceleration sensing mass mounted directly to the first spring between the fixed end and the first contact, such that when the shock sensor is subject to an accelerative force the first spring bends in a direction aligned with said accelerative force to engage the first contact with the second contact; and
   g) a means for increasing switch dwell time by forming a two stage mechanical system.

8. The shock sensor of claim 7 wherein the first contact and the second contact are inclined from the plane defined by the spring.

9. The shock sensor of claim 8 wherein the first and second contacts are rotated from the plane and are inclined with respect to the plane defined by the spring at an angle of about 60 degrees.

10. The shock sensor of claim 8 wherein the first and second contacts are rotated from the plane defined by the spring about a line defined along the spring from the fixed end to the movable end.

* * * * *